US008159909B2

United States Patent
Nakao (10) Patent No.: US 8,159,909 B2
(45) Date of Patent: Apr. 17, 2012

(54) OPTICAL HEAD, OPTICAL DRIVE APPARATUS, AND METHOD FOR GENERATING TRACKING ERROR SIGNAL

(75) Inventor: Takashi Nakao, Kanagawa (JP)

(73) Assignee: Sony Corporation, Tokyo (JP)

( * ) Notice: Subject to any disclaimer, the term of this patent is extended or adjusted under 35 U.S.C. 154(b) by 701 days.

(21) Appl. No.: 11/143,576

(22) Filed: Jun. 3, 2005

(65) Prior Publication Data

US 2005/0286360 A1    Dec. 29, 2005

(30) Foreign Application Priority Data

Jun. 7, 2004    (JP) .................. 2004-168462

(51) Int. Cl.
G11B 7/00    (2006.01)
(52) U.S. Cl. .................................. 369/44.37
(58) Field of Classification Search ............... 369/13.39, 369/13.4, 13.41, 13.42, 44.41
See application file for complete search history.

(56) References Cited

U.S. PATENT DOCUMENTS

| | | | |
|---|---|---|---|
| 4,775,968 A | 10/1988 | Ohsato | |
| 5,602,809 A | 2/1997 | Shikano | |
| 5,764,606 A * | 6/1998 | Fukumoto et al. | 369/44.41 |
| 5,923,632 A | 7/1999 | Kato et al. | |
| 6,034,933 A * | 3/2000 | Rokutan | 369/53.27 |
| 6,798,723 B2 * | 9/2004 | Hayashi et al. | 369/44.23 |
| 7,345,981 B2 * | 3/2008 | Kim et al. | 369/112.03 |
| 2002/0141320 A1 | 10/2002 | Hamaoka | |
| 2002/0159378 A1 | 10/2002 | Lee et al. | |
| 2002/0181343 A1 | 12/2002 | Hayashi et al. | |
| 2003/0007436 A1 | 1/2003 | Komma et al. | |

FOREIGN PATENT DOCUMENTS

| | | |
|---|---|---|
| EP | 0 634 742 | 1/1995 |
| EP | 1 207 523 A2 | 5/2002 |
| EP | 1 304 687 | 4/2003 |
| EP | 1 391 884 | 2/2004 |
| JP | 07-134831 A | 5/1995 |
| JP | 08-185635 A | 7/1996 |
| JP | 10-255300 A | 9/1998 |
| JP | 11-003535 | 1/1999 |
| JP | 2000-235715 | 8/2000 |
| JP | 2002-230805 A | 8/2002 |
| JP | 2005-353252 A | 12/2005 |

OTHER PUBLICATIONS

Singapore Search Report mailed Feb. 23, 2006.
Singapore Written Opinion mailed Feb. 23, 2006.
European Search Report; Application No./Patent No. 05291214.4-2210; dated Oct. 13, 2006.
Japanese Office Action issued in Jun. 2, 2009 for corresponding Japanese Application No. 2004-168462.

* cited by examiner

Primary Examiner — Will J Klimowicz
Assistant Examiner — Mark Fischer
(74) Attorney, Agent, or Firm — Rader, Fishman & Grauer PLLC (57) ABSTRACT

An optical head that includes a laser light source, an optical system that applies 0-order diffracted light, +1-order diffracted light, and −1-order diffracted light, which are produced from laser light emitted from the laser light source, onto a recording medium having a plurality of information recording layers, and a light-receiving device for detecting reflected light guided by the optical system. The light-receiving device includes a first light-receiving section for detecting reflected light of the 0-order diffracted light, two second light-receiving sections for detecting reflected light of the +1-order diffracted light and reflected light of the −1-order diffracted light, and a third light-receiving section provided near at least one of the second light-receiving sections to receive stray light reflected from one or more information recording layers other than a target information recording layer to be accessed.

4 Claims, 10 Drawing Sheets

OPTICAL HEAD, OPTICAL DRIVE APPARATUS, AND METHOD FOR GENERATING TRACKING ERROR SIGNAL

CROSS REFERENCES TO RELATED APPLICATIONS

The present invention contains subject matter related to Japanese Patent Application JP 2004-168462 filed in the Japanese Patent Office on Jun. 7, 2004, the entire contents of which are incorporated herein by reference.

BACKGROUND OF THE INVENTION

1. Field of the Invention

The present invention relates to an optical head suitably used for an optical recording medium having a plurality of information recording layers, an optical drive apparatus including the optical head, and a tracking-error-signal generating method.

2. Description of the Related Art

As recording media on and from which digital data is recorded and reproduced, optical discs (including magnetooptical discs), such as CDs (compact discs), MDs (minidiscs), and DVDs (digital versatile discs) are known. An optical disc is a general term of disc-shaped recording media, in which laser light is applied on a thin metal plate protected with plastic, and signals are read on the basis of changes of reflected light.

Optical discs include read-only discs such as CDs, CD-ROMs, and DVD-ROMs, and writable discs on which user data can be written, such as MDs, CD-Rs, CD-RWs, DVD-Rs, DVD-RWs, DVD+RWs, and DVD-RAMs. Data can be recorded on writable discs by, for example, magnetooptical recording, phase change recording, or dye-film change recording. Dye-film change recording is also called write-once recording because data can be recorded thereon only once, and this recording method is suitably used to store data. In contrast, magnetooptical recording and phase change recording allow data rewriting, and have various applications, for example, recording of various content data such as music, pictures, games, and application programs.

Furthermore, high-density optical discs, called Blu-ray Discs, have recently been developed to markedly increase the recording capacity.

High-density discs, such as Blu-ray Discs, include a cover layer of 0.1 mm in thickness. In the discs, phase change marks are recorded and reproduced by using a laser with a wavelength of 405 nm (a so-called blue laser) and an objective lens having a numerical aperture (NA) of 0.85 in combination. When the track pitch is 0.32 μm, the linear density is 0.12 μm/bit, a data block of 64 KB (kilobytes) is a unit of recording and reproduction data, and the format efficiency is approximately 82%, approximately 23.3 GB (gigabytes) of data can be recorded on and reproduced from a disc having a diameter of 12 cm.

When the linear density is set at 0.112 μm/bit without changing the format, 25 GB of data can be recorded and reproduced.

By providing a plurality of recording layers, the capacity can be increased. For example, when two recording layers are provided, the capacity can be increased to double the above-mentioned capacity, that is, to 46.6 GB or 50 GB.

SUMMARY OF THE INVENTION

Figure 10:
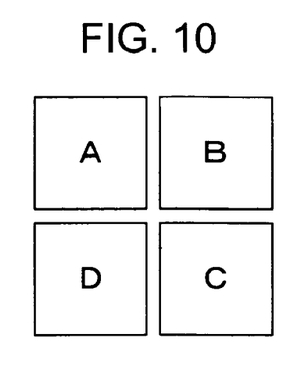
FIG. 10 is an explanatory view of a four-divided photodetector.

A push-pull error signal detection method is typically used to generate a tracking error signal so that a light spot applied on an optical disc can trace a spiral track provided on the disc, for example, a track formed of a guide groove or a line of pits. In the push-pull method, reflected light diffracted in accordance with the shape of the groove is received by, for example, a four-divided photosensor (A, B, C, and D) shown in FIG. 10 to detect an interference distribution between 0-order diffracted light (main beam) and +1-order diffracted light (side beams), thereby generating a tracking error signal.

As a method for reducing the influence of the change in amount of light, lens offset, and disc tilt on a push-pull error signal, for example, U.S. Pat. No. 4,775,968 discloses a differential push-pull detection method.

Figure 11:
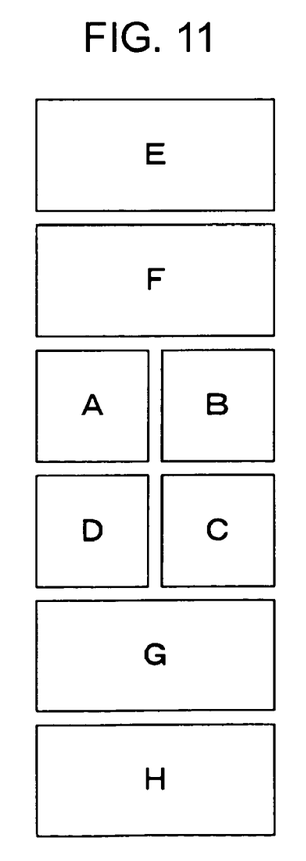
FIG. 11 is an explanatory view of an eight-divided photodetector.

In this method, eight photoreceptors A, B, C, D, E, F, G, and H shown in FIG. 11 are used as an example. More specifically, a differential push-pull error signal is obtained by subtracting the product of the sum (E−F)+(G−H) of push-pull signals (E−F) and (G−H) obtained from two side beams and a coefficient from a push-pull signal (A+B)−(C+D) obtained from a main beam.

In optical-disc recording and reproducing apparatuses that apply a main beam and side beams, the intensity ratio of the main beam and the side beams is often set at approximately 10:1.

When data is recorded on and reproduced from a disc having a plurality of recording layers, such as a double-layer disc, at this setting, the following problem occurs:

For example, when a light spot is applied on one information recording layer of a double-layer disc that is to be accessed for signal reproduction, extra reflected light (stray light) from the other information recording layer that is not to be accessed is also detected by the photoreceptors because it is difficult to separate the stray light.

This phenomenon is also called interlayer stray light. In an AGC (automatic gain control) circuit that standardizes a differential push-pull error signal by the disc reflectance or the radiation power for recording or reproduction, interlayer stray light of a main beam is detected by the photoreceptors for side beams, and this makes the standardization of the error signal inaccurate. Consequently, a proper tracking error signal is not ensured, and servo controllability is reduced.

In view of this problem, it is desirable to prevent the accuracy of operation of a differential push-pull error signal from decreasing during recording on and reproduction from a multilayer disc.

An optical head according to an embodiment of the present invention includes a laser light source; an optical system that produces 0-order diffracted light, +1-order diffracted light, and −1-order diffracted light from laser light emitted from the laser light source, that forms an optical path for applying the 0-order diffracted light, the +1-order diffracted light, and the −1-order diffracted light onto a recording medium having a plurality of information recording layers, and that forms an optical path for guiding reflected light from the recording medium; and a light-receiving device for receiving and detecting the reflected light guided by the optical system. The light-receiving device includes a first light-receiving section divided at least in a tangential direction of a recording track on the recording medium to detect reflected light of the 0-order diffracted light, two second light-receiving sections divided at least in the tangential direction of the recording track on the recording medium to detect reflected light of the +1-order diffracted light and reflected light of the −1-order diffracted light, and a third light-receiving section provided near at least one of the second light-receiving sections and at a position such as not to receive reflected light of the 0-order diffracted light, reflected light of the +1-order diffracted light, and reflected light of the −1-order diffracted light from a target information recording layer of the information recording layers to be accessed, the third light-receiving section receiving stray light reflected from one or more information recording layers other than the target information recording layer.

Preferably, the third light-receiving section is disposed at a position such as to substantially uniformly receive stray light of the 0-order diffracted light, stray light of the +1-order diffracted light, and stray light of the −1-order diffracted light reflected by the one or more information recording layers other than the target information recording layer.

Preferably, the third light-receiving section has an area equivalent to the area of photoreceptors of the second light-receiving sections.

An optical drive apparatus according to another embodiment of the present invention includes an optical head that applies laser light onto a recording medium having a plurality of information recording layers and that detects reflected light from the recording medium; a signal generating circuit that generates a focusing error signal, a tracking error signal, and an information signal on the basis of the reflected light detected by the optical head; a reproduction circuit that obtains reproduction information by processing the information signal generated by the signal generating circuit; and a servo circuit that performs focusing servo operation and tracking servo operation according to the focusing error signal and the tracking error signal generated by the signal generating circuit. The optical head includes a laser light source for emitting the laser light; an optical system that produces 0-order diffracted light, +1-order diffracted light, and −1-order diffracted light from the laser light emitted from the laser light source, that forms an optical path for applying the 0-order diffracted light, the +1-order diffracted light, and the −1-order diffracted light onto the recording medium, and that forms an optical path for guiding the reflected light from the recording medium; and a light-receiving device for receiving and detecting the reflected light guided by the optical system. The light-receiving device includes a first light-receiving section divided at least in a tangential direction of a recording track on the recording medium to detect reflected light of the 0-order diffracted light, two second light-receiving sections divided at least in the tangential direction of the recording track on the recording medium to detect reflected light of the +1-order diffracted light and reflected light of the −1-order diffracted light, and a third light-receiving section provided near at least one of the second light-receiving sections and at a position such as not to receive the reflected light of the 0-order diffracted light, the reflected light of the +1-order diffracted light, and the reflected light of the −1-order diffracted light from a target information recording layer of the information recording layers to be accessed, the third light-receiving section receiving stray light reflected from one ore more information recording layers other than the target information recording layer. The signal generating circuit generates the tracking error signal in a differential push-pull method on the basis of detection signals from the first, second, and third light-receiving sections in the optical head.

Preferably, the signal generating circuit generates a push-pull signal for the 0-order diffracted light from the detection signal from the first light-receiving section, generates push-pull signals for the +1-order diffracted light and the −1-order diffracted light from the detection signals from the second light-receiving sections, standardizes the push-pull signal for the 0-order diffracted light, the push-pull signal for the +1-order diffracted light, and the push-pull signal for the −1-order diffracted light, generates the tracking error signal by operation on the standardized push-pull signals, and generates, from the detection signal from the third light-receiving section, standardization signals used to standardize the push-pull signal for the +1-order diffracted light and the push-pull signal for the −1-order diffracted light.

Preferably, the standardization signals are generated by subtracting the product of the detection signal from the third light-receiving section and a coefficient from the sum of the detection signals from the second light-receiving sections.

A tracking-error-signal generating method according to a further embodiment of the present invention is provided for an optical drive apparatus having an optical head. The optical head includes a laser light source for emitting laser light; an optical system that produces 0-order diffracted light, +1-order diffracted light, and −1-order diffracted light from the laser light emitted from the laser light source, that forms an optical path for applying the 0-order diffracted light, the +1-order diffracted light, and the −1-order diffracted light onto a recording medium having a plurality of information recording layers, and that forms an optical path for guiding reflected light from the recording medium; and a light-receiving device for receiving and detecting the reflected light guided by the optical system. The light-receiving device includes a first light-receiving section divided at least in a tangential direction of a recording track on the recording medium to detect reflected light of the 0-order diffracted light, two second light-receiving sections divided at least in the tangential direction of the recording track on the recording medium to detect reflected light of the +1-order diffracted light and reflected light of the −1-order diffracted light, and a third light-receiving section provided near at least one of the second light-receiving sections and at a position such as not to receive the reflected light of the 0-order diffracted light, the reflected light of the +1-order diffracted light, and the reflected light of the −1-order diffracted light from a target information recording layer of the information recording layers to be accessed, the third light-receiving section receiving stray light reflected from one or more information recording layers other than the target information recording layer. The tracking-error-signal generating method includes the steps of generating a push-pull signal for the 0-order diffracted light from a detection signal from the first light-receiving section; standardizing the push-pull signal for the 0-order diffracted light; generating a push-pull signal for the +1-order diffracted light and a push-pull signal for the −1-order diffracted light from detection signals from the second light-receiving sections; generating, from a detection signal from the third light-receiving section, a standardization signal used to standardize the push-pull signal for the +1-order diffracted light and the push-pull signal for the −1-order diffracted light; standardizing the push-pull signal for the +1-order diffracted light and the push-pull signal for the −1-order diffracted light by using the standardization signal; and generating a tracking error signal in a differential push-pull method by operation on the standardized push-pull signal for the 0-order diffracted light, the standardized push-pull signal for the +1-order diffracted light, and the standardized push-pull signal for the −1-order diffracted light.

Preferably, the standardization signal is generated by subtracting the product of the detection signal from the third light-receiving section and a coefficient from the sum of the detection signals from the second light-receiving sections.

That is, the third light-receiving section detects interlayer stray light. The standardization signal used to standardize the ±1-order diffracted light is generated from the detection signal from the third light-receiving section in order to reduce the influence of the interlayer stray light.

According to the embodiments of the present invention, it is possible to reduce an error of an operation coefficient when generating a tracking error signal in a differential push-pull method caused by interlayer stray light during signal recording on or reproduction from a multilayer disc. That is, the influence of interlayer stray light on push-pull signals for +1-order diffracted light is reduced in standardization by detecting and using the stray light to generate a standardization signal used to standardize the push-pull signals for the +1-order diffracted light.

More specifically, the standardization signal is generated by subtracting the product of a detection signal (stray light component) from the third light-receiving section and a coefficient from the sum of detection signals from the second light-receiving sections (sum signals of ±1-order diffracted light), and is used to standardize the push-pull signals of the second light-receiving sections (push-pull signals for ±1-order diffracted light). This achieves standardization with less influence of interlayer stray light.

Consequently, the generation of a tracking error signal in the differential push-pull method is also optimized for multilayer discs having two or more recording layers, a stable tracking servo control is achieved, and the performance of the device is improved.

In order to effectively reduce the influence of interlayer stray light, preferably, the third light-receiving section is disposed at a position such as to substantially uniformly receive stray light of the 0-order diffracted light, stray light of the +1-order diffracted light, and stray light of the −1-order diffracted light reflected by all information recording layers that are not to be accessed, or the photoreceptor of the third light-receiving section has an area equivalent to the area of photoreceptors of the second light-receiving sections.

DESCRIPTION OF THE PREFERRED EMBODIMENTS

A disc drive apparatus according to an embodiment of the present invention will be described below. This disc drive apparatus corresponds to the optical drive apparatus of the present invention. An optical pickup mounted in the disc drive apparatus corresponds to the optical head of the present invention. In the disc drive apparatus, the tracking-error-signal generating method of the present invention is carried out.

Prior to describing the configuration of the disc drive apparatus, a description will be given of an optical disc.

In order to record data on a disc, for example, by magnetooptical recording, dye-film change recording, or phase change recording, a guide means is generally necessary for tracking of a data track. For this reason, a groove is formed as a pregroove beforehand, and the groove or a land (a portion of table-shaped cross section between sections of the groove) is used as a data track.

Address information needs to be recorded so that data can be recorded at a predetermined position on a data track. Address information is sometimes recorded by wobbling a groove.

That is, for example, a track on which data is recorded is formed as a pregroove beforehand, and a side wall of the pregroove is wobbled according to address information.

In this case, the address can be read from wobbling information obtained as reflected-light information during data recording and reproduction. For example, data can be recorded on or reproduced from a desired position without recording bit data indicating the address on the track beforehand.

By thus adding address information in the form of a wobbling groove, for example, it is unnecessary to record the addresses in the form of bit data on discrete address areas provided on the track. Since the address areas are removed, the recording capacity for real data increases.

Figure 2A:
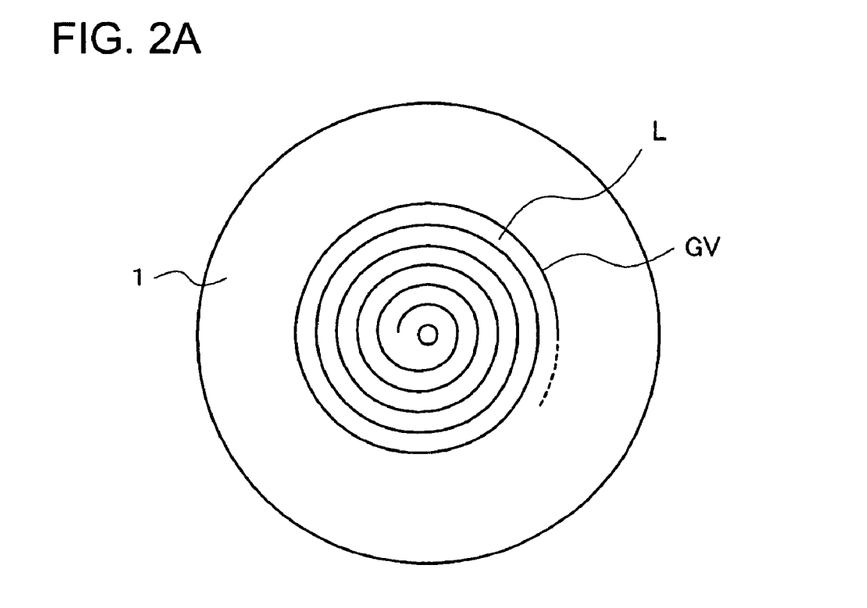
FIG. 2A is an explanatory view of a disc used in the embodiment.
Figure 2B:
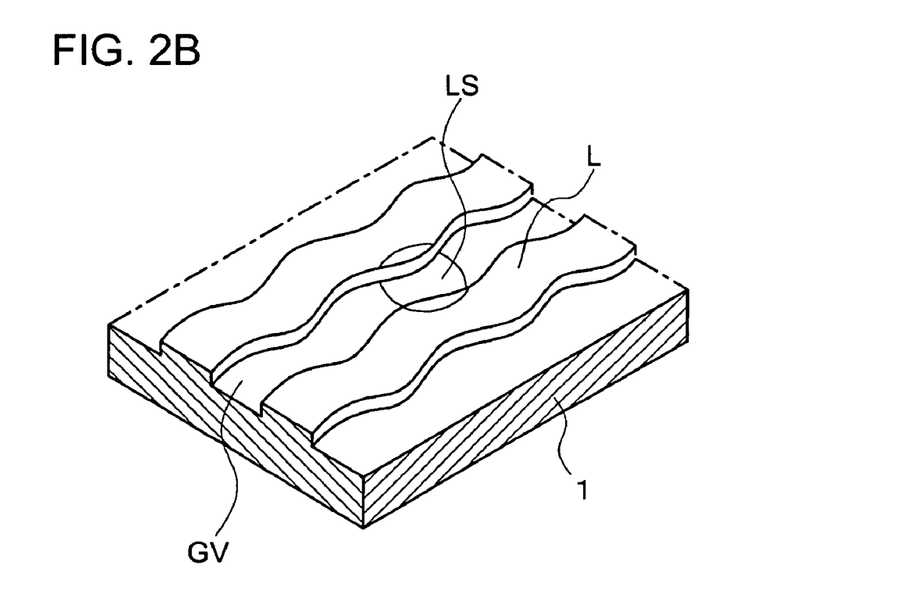
FIG. 2B is an explanatory view showing a cross-sectional structure of the disc.

When it is assumed that an optical disc 1 used in this embodiment of the present invention is of a rewritable or write-once type, it has a groove GV serving as a recording track, as shown in FIG. 2A. The groove GV spirally extends from the inner periphery to the outer periphery. For this reason, in a radial cross section of the optical disc 1, projecting lands L and recessed grooves GV are alternately provided, as shown in FIG. 2B.

The groove GV of the optical disc 1 wobbles in the tangential direction. The form of wobbling of the groove GV corresponds to a wobble signal obtained by modulating the address or the like. For this reason, in the optical disc drive apparatus, the positions of both edges of the groove GV are detected from light reflected from a laser spot LS formed on the groove GV by laser radiation, and components of the edge positions changed in the disc radial direction when the laser spot LS is moved along the recording track are extracted, thereby producing a wobble signal and demodulating the address information or the like. Absolute time (address) information indicated by such a wobbled groove is called ATIP (Absolute Time in Pregroove) or ADIP (Address in Pregroove).

While groove recording is performed on the optical disc in this embodiment, the present invention is applicable not only to such an optical disc using groove recording, but also to an optical disc using land recording for recording data on the land, an optical disc in which data is recorded on both the groove and the land, and a read-only optical disc in which a track is formed by emboss pits.

A description will be given below of a case in which the optical disc 1 of this embodiment is a Blu-ray Disc. In this case, the optical disc 1 is 120 mm in diameter, and 1.2 mm in thickness (a cover layer is approximately 0.1 mm in thickness). In these respects, the optical disc 1 is outwardly similar to a CD (compact disc) and a DVD (digital versatile disc).

With a laser with a wavelength of 405 nm (a so-called blue laser) and an objective lens having an NA of 0.85 in combination, for example, a phase change mark is recorded and reproduced. When the track pitch is 0.32 μm, the linear density is 0.12 μm/bit, a data block of 64 KB (kilo bytes) is a unit of recording and reproduction, and the format efficiency is approximately 82%, data of approximately 23.3 GB (giga bytes) can be recorded on and reproduced from a disc having a diameter of 12 cm.

As Blu-ray Discs, not only one-layer discs having one recording layer, but also discs, such as double-layer discs, having a plurality of recording layers have been developed.

By increasing the number of recording layers, the capacity can be further increased. For example, when two recording layers are provided, the capacity can be increased to 46.6 GB, which is double the above-mentioned capacity.

Of course, an n-number of recording layers (n is three or more) may be provided. In this case, the capacity can be increased to be n-times the above-mentioned capacity.

Figure 3A:
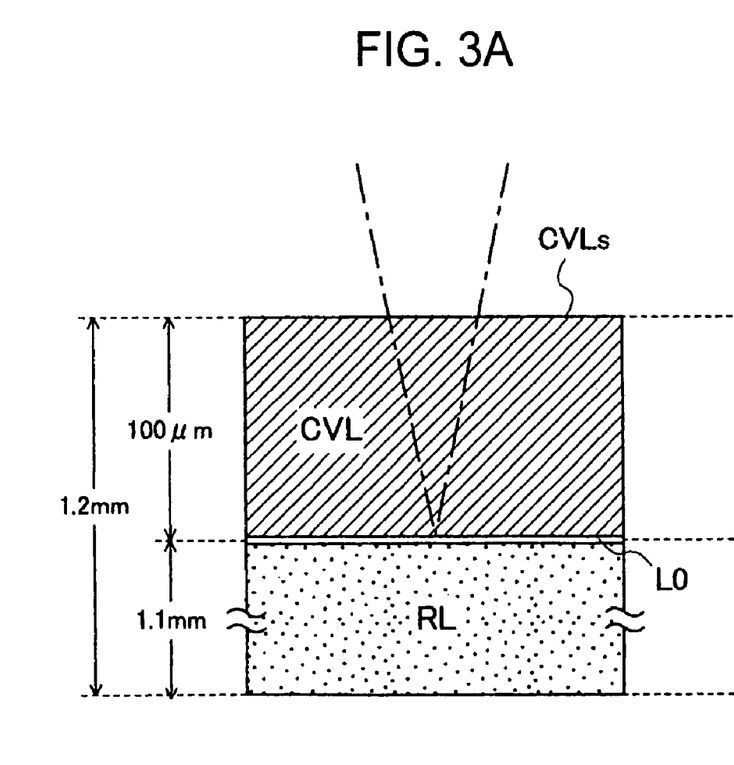
FIG. 3A is an explanatory view showing the structure of a one-layer disc having one recording layer.
Figure 3B:
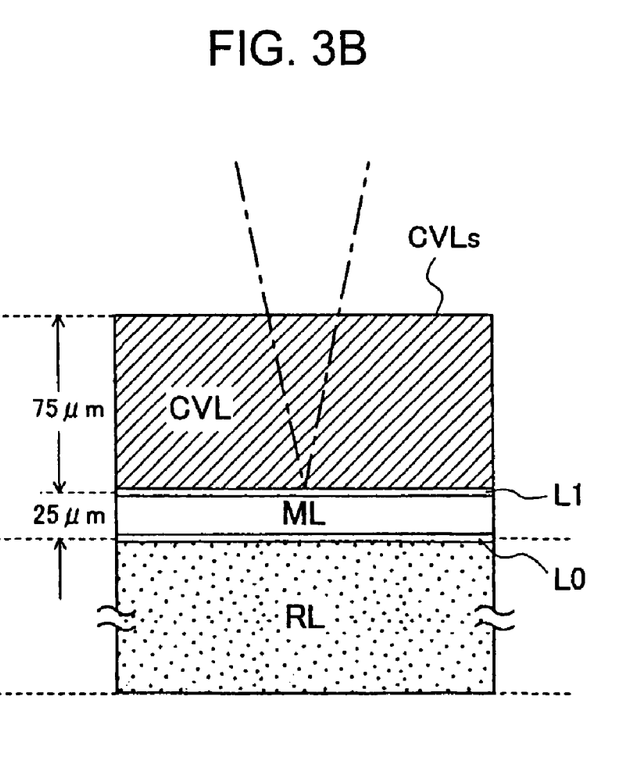
FIG. 3B is an explanatory view showing the structure of a double-layer disc having two recording layers.

FIGS. 3A and 3B schematically show the layer structures, respectively, of a one-layer disc and a double-layer disc.

The thickness of the discs is 1.2 mm, and the thickness of a substrate RL made of polycarbonate is approximately 1.1 mm.

An optical beam emitted from a disc drive apparatus (recording and reproduction apparatus) that performs recording on and reproduction from the disc is shown by a one-dot chain line. The optical beam is blue laser light having a wavelength of 405 nm, and is collected via a cover layer (substrate) CVL by an objective lens having an NA of 0.85, as shown in the figures.

In a one-layer disc shown in FIG. 3A, for example, a recording layer L0 is provided on a substrate RL of 1.1 mm in thickness, and a cover layer CVL of 100 μm in thickness is provided thereon.

During recording and reproduction, an optical beam is collected on the recording layer L0 via the cover layer CVL.

In a double-layer disc shown in FIG. 3B, for example, a first recording layer L0 is provided on a substrate RL of 1.1 mm in thickness, a second recording layer L1 is provided thereon with a middle layer ML of 25 μm disposed therebetween, and a cover layer CVL of 75 μm is provided on the second recording layer L1.

During recording and reproduction, an optical beam is collected on the first and second recording layers L0 and L1 via the cover layer CVL.

Although not shown, in an n-layer disc having three or more recording layers, for example, it is conceivable to form a recording layer Ln at a position closer to a surface CVLs of the cover layer CVL than the second recording layer L1 shown in FIG. 3B while a middle layer ML of 25 μm is disposed therebetween.

That is, the n-th recording layer L(n−1) is provided on the n−1-th recording layer L(n−2) with the middle layer ML disposed therebetween. Corresponding to the n-th recording layer L(n−1), the thickness of the cover layer CVL is 100−(n−1)×25 μm.

Figure 1:
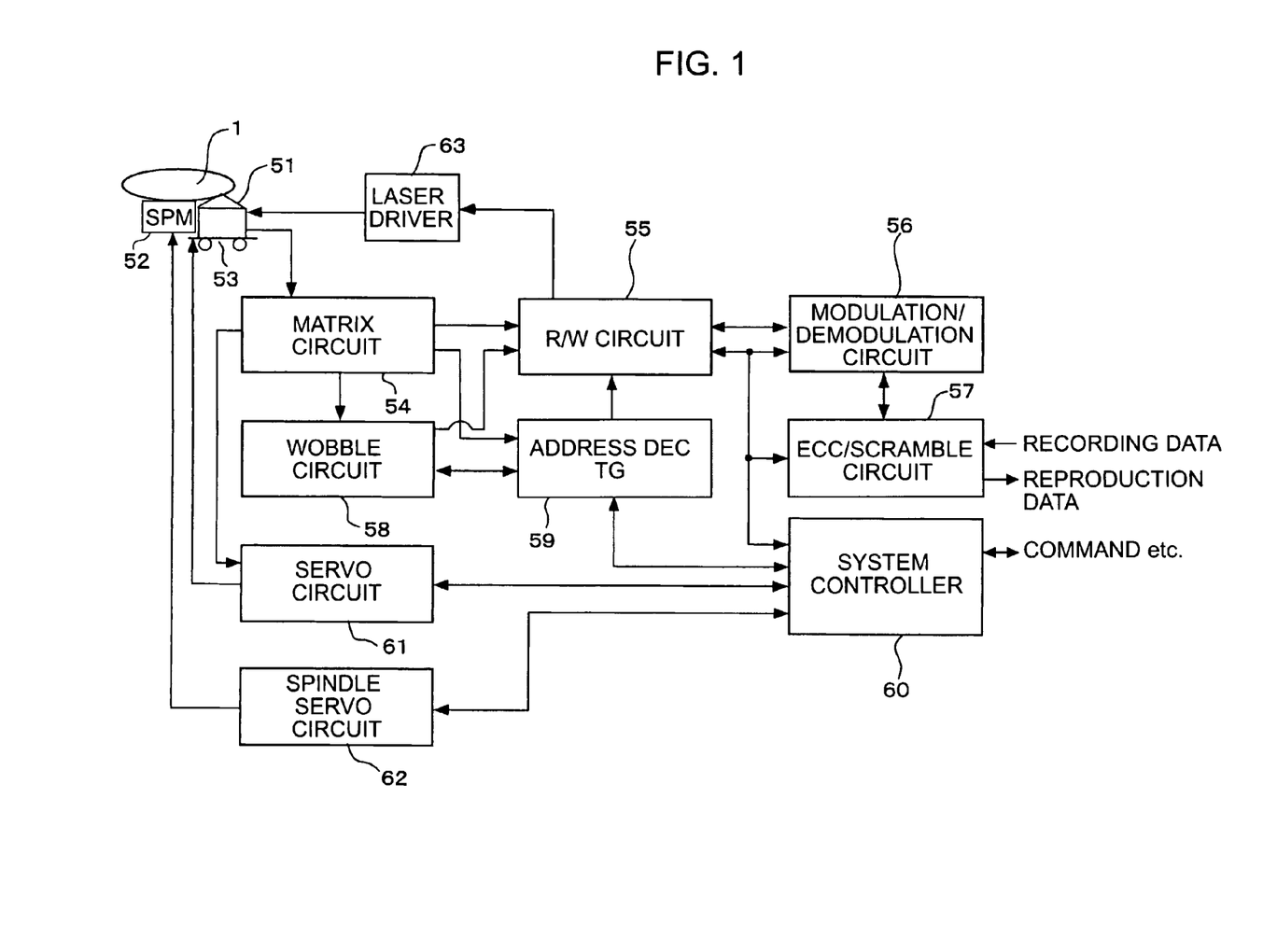
FIG. 1 is a block diagram of a disc drive apparatus according to an embodiment of the present invention.

FIG. 1 shows the configuration of the disc drive apparatus that performs recording on and reproduction from the optical disc 1.

The disc 1 is placed on a turntable (not shown), and is rotated at a constant linear velocity (CLV) by a spindle motor 52 during recording and reproduction.

During reproduction, data on the disc 1 is read out by an optical pickup (optical head) 51. ADIP information recorded by wobbling a groove track, and disc information are also read out.

During recording on the optical disc 1, data is recorded on the groove track by the optical pickup 51 in the form of pit marks (dye change marks in a write-once disc, or phase change marks in a rewritable disc).

The optical pickup 51 includes a laser diode serving as a laser light source, a photodetector for detecting reflected light, an objective lens serving as an output end of laser light, and an optical system that applies the laser light onto a disc recording surface via the objective lens and that guides reflected light to the photodetector. These components will be described in detail later with reference to FIG. 4.

In the optical pickup 51, the objective lens is held by a biaxial mechanism to be movable in the tracking direction and focusing direction.

The whole optical pickup 51 is movable in the disc radial direction by a sled mechanism 53.

The laser diode in the optical pickup 51 is driven in response to a drive signal (drive current) from a laser driver 63 so as to emit laser light.

Information about reflected light from the disc 1 is detected by the photodetector, and is supplied to a matrix circuit 54 in the form of an electric signal in accordance with the amount of the reflected light.

The matrix circuit 54 includes a current-voltage conversion circuit for output currents from a plurality of photoreceptors serving as photodetectors, and a matrix operation/amplification circuit, and generates signals necessary for matrix operation.

For example, the matrix circuit 54 generates a high-frequency signal (reproduction data signal) corresponding to reproduction data, and a focusing error signal and a tracking error signal for servo control. The matrix circuit 54 also generates a signal concerning wobbling of the groove, that is, a push-pull signal used to detect wobbling.

The matrix circuit 54 is sometimes provided inside the optical pickup 51.

A reproduction data signal, a focusing error signal and a tracking error signal, and a push-pull signal serving as information about detection of the wobbling groove are supplied from the matrix circuit 54, respectively, to a reader/writer circuit 55, a servo circuit 61, and a wobble circuit 58.

The reader/writer circuit 55 subjects a reproduction data signal to binarization and reproduction clock generation using a phase-locked loop, reproduces data read from pit marks on the disc 1, and supplies the data to a modulation/demodulation circuit 56.

The modulation/demodulation circuit 56 includes a section functioning as a decoder during reproduction and a section functioning as an encoder during recording.

In a decoding operation during reproduction, a run-length limited code is demodulated according to a reproduction clock.

An ECC/scramble circuit 57 performs ECC encoding for adding an error correction code, and scrambling during recording.

During reproduction, the ECC/scramble circuit 57 performs descrambling corresponding to scrambling, and ECC decoding for error correction. The ECC/scramble circuit 57 fetches data demodulated by the modulation/demodulation circuit 56 into an inner memory, and subjects the data to descrambling and error detection/correction, thereby obtaining reproduction data.

Data decoded by the ECC/scramble circuit 57 is read out under the control of a system controller 60, and is transferred as reproduction data to a host apparatus (not shown). The host apparatus is, for example, an AV (audio-visual) system or a personal computer.

A push-pull signal output as a signal concerning the wobbling groove of the disc 1 from the matrix circuit 54 is processed by the wobble circuit 58. The push-pull signal, serving as ADIP information, is demodulated to a data stream, which constitutes ADIP, by the wobble circuit 58, and is supplied to an address decoder 59.

The address decoder 59 decodes the supplied data to obtain an address, and supplies the address to the system controller 60.

The address decoder 59 also generates clocks by PLL processing using wobble signals supplied from the wobble circuit 58, and supplies the clocks, for example, as encode clocks for recording to the circuits.

During recording on the disc 1, recording data is transferred from the host apparatus, and is supplied to the memory in the ECC/scramble circuit 57 to be buffered.

In this case, the ECC/scramble circuit 57 encodes the buffered recording data by ECC encoding, scrambling, and addition of a sub-code.

The data subjected to ECC encoding and scrambling is modulated by Run-Length-Limited (RLL) (1,7) Parity Preserve/Prohibit (PP) Repeated Minimum Transition Runlength (RMTR) in the modulation/demodulation circuit 56, and is then supplied to the reader/writer circuit 55.

As described above, clocks generated from wobble signals are used as encode clocks serving as reference clocks for this encoding during recording.

The recording data produced by encoding is subjected to recording compensation in the reader/writer circuit 55, that is, the recording power is finely adjusted and the laser drive pulse waveform is adjusted depending on, for example, the characteristic of the recording layer, the shape of a laser spot, and the recording linear velocity. The recording data is then supplied as a laser drive pulse to the laser driver 63.

The laser driver 63 gives the supplied laser drive pulse to the laser diode in the optical pickup 51 to emit laser light. Pit marks according to the recording data are thereby formed on the disc 1.

The laser driver 63 includes a so-called APC (automatic power control) circuit, monitors the laser output power on the basis of the output from a laser-power monitoring photodetector provided in the optical pickup 51, and controls the laser output power to be constant, for example, regardless of the temperature. A target value of the laser output is given from the system controller 60, and control is exerted so that the laser output is equal to the target value during recording and reproduction.

The servo circuit 61 generates various servo drive signals, such as a focusing drive signal, a tracking drive signal, and a sled drive signal, from a focusing error signal and a tracking error signal output from the matrix circuit 54, and exerts servo control.

That is, a focusing drive signal and a tracking drive signal are generated in accordance with a focusing error signal and a tracking error signal in order to drive a focusing coil and tracking coil of the biaxial mechanism inside the optical pickup 51. A tracking servo loop and a focusing servo loop are formed by the optical pickup 51, the matrix circuit 54, the servo circuit 61, and the biaxial mechanism.

The servo circuit 61 performs a track jump operation by turning off the tracking servo loop and outputting a jump drive signal in response to a track jump command from the system controller 60.

The servo circuit 61 also generates a sled drive signal on the basis of a sled error signal obtained as a low-frequency component of the tracking error signal and an access control command from the system controller 60 in order to drive the sled mechanism 53. Although not shown, the sled mechanism 53 includes, for example, a main shaft that holds the optical pickup 51, a sled motor, and a transmission gear. The sled motor is driven according to a sled drive signal to perform a required slide operation of the optical pickup 51.

A spindle servo circuit 62 exerts control to rotate the spindle motor 52 at a constant linear velocity (CLV).

The spindle servo circuit 62 obtains a clock generated by PLL processing of a wobble signal as information about the current rotation speed of the spindle motor 52, and compares the clock with given CLV reference speed information, thereby generating a spindle error signal.

During data reproduction, a reproduction clock (clock serving as the standard for decoding) generated by a PLL in the reader/writer circuit 55 is information about the current rotation speed of the spindle motor 52. Therefore, a spindle error signal may also be generated by comparing the reproduction clock with the given CLV reference speed information.

The spindle servo circuit 62 outputs a spindle drive signal generated on the basis of the spindle error signal, and carries out CLV rotation of the spindle motor 52.

The spindle servo circuit 62 also generates a spindle drive signal in response to a spindle kick/brake control signal from the system controller 60, and performs start, stop, acceleration, and speed reduction operations of the spindle motor 52.

The above-described operations of the servo system and the recording and reproduction system are controlled by the system controller 60 such as a microcomputer.

The system controller 60 performs various processes according to commands from the host apparatus.

For example, when a write command is output from the host apparatus, the system controller 60 first moves the optical pickup 51 to an address where data should be written, and causes the ECC/scramble circuit 57 and the modulation/demodulation circuit 56 to encode data (e.g., video data in various formats, such as MPEG-2, or audio data) transferred from the host apparatus, as described above. A laser drive pulse is then supplied from the reader/writer circuit 55 to the laser driver 63, and recording is performed.

For example, when a read command is supplied from the host apparatus to transfer certain data recorded on the disc 1 (e.g., MPEG-2 video data), the system controller 60 first controls an operation of seeking a designated address. That is, the system controller 60 sends a seek command to the servo circuit 61 so that the optical pickup 51 accesses the designated address.

Subsequently, control is exerted over an operation necessary for transferring data at the designated address to the host apparatus. That is, required data is read out from the disc 1, is subjected to, for example, decoding and buffering by the reader/writer circuit 55, the modulation/demodulation circuit 56, and the ECC/scramble circuit 57, and is then transferred.

Figure 4:
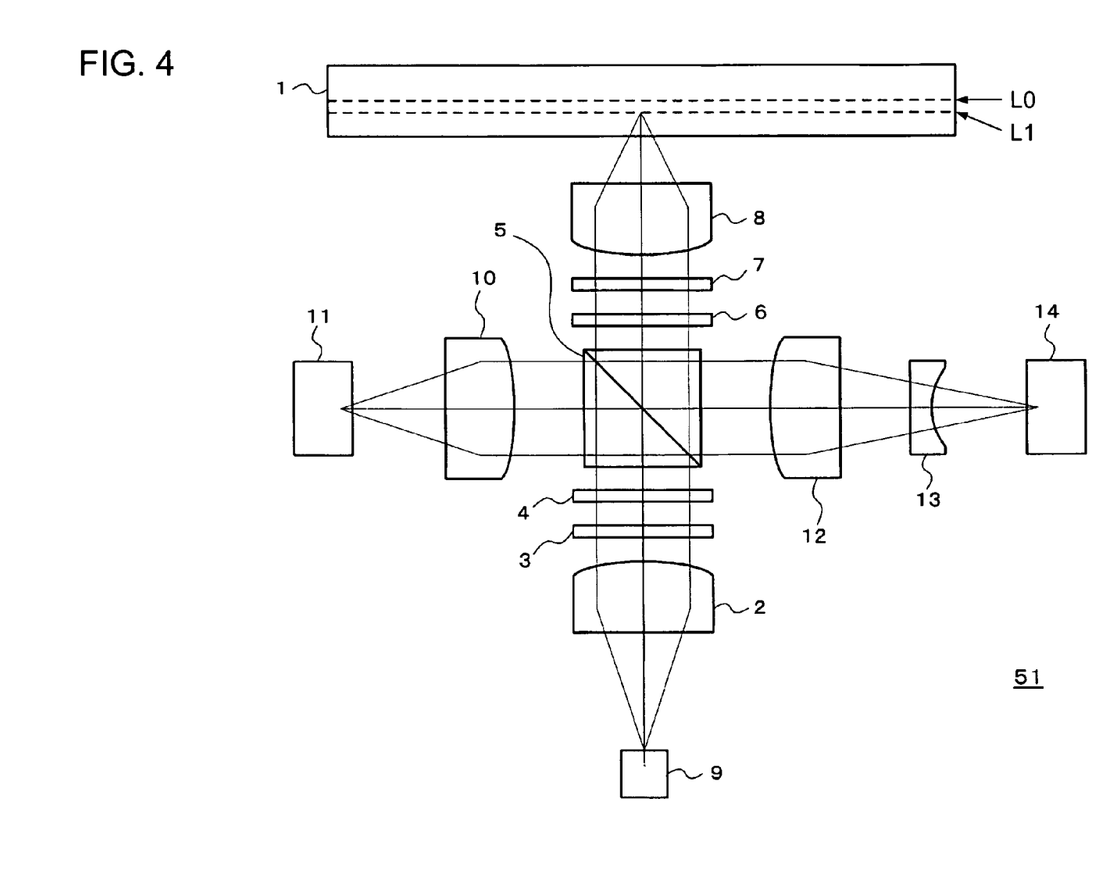
FIG. 4 is an explanatory view of an optical head in the embodiment.

FIG. 4 shows an optical system of the optical pickup 51 mounted in this disc drive apparatus.

Light emitted from a semiconductor laser 9 is collimated by a collimator lens 2, and reaches a diffraction grating 4 via a half-wave plate 3. In the diffraction grating 4, side beams (+1-order diffracted light and −1-order diffracted light) are generated to form side spots necessary to generate a tracking error signal, and are guided to a polarization beam splitter 5 together with a main beam (0-order diffracted light) that forms a main spot.

The main beam (0-order diffracted light) and the side beams (±1-order diffracted light) pass through the polarization beam splitter 5, a liquid crystal element 6, and a quarter-wave plate 7, and are collected by an objective lens 8, for example, onto one of two recording layers, a layer 0 (L0) and a layer 1 (L1), in the disc 1.

A part of the light emitted from the semiconductor laser 9 is reflected by the polarization beam splitter 5, is guided to an emitted-light detecting photodetector (monitoring photodetector) 11 by a light-collecting lens 10, and is used to control the laser output to be constant.

The amount of light incident on the monitoring photodetector 11 can be adjusted by turning the half-wave plate 3. An actual laser output is controlled to be an arbitrarily amount of emitted light by the above-described APC circuit in the laser driver 63.

The liquid crystal element 6 has concentric electrodes, and serves to correct spherical aberration caused by a thickness error of the cover layer in the disc 1 by controlling the voltages applied to the electrodes. The quarter-wave plate 7 disposed before the objective lens 8 serves to convert linearly polarized light from the semiconductor laser 9 into circularly polarized light.

Reflected light from the disc 1 reaches the polarization beam splitter 5 via the objective lens 8, the quarter-wave plate 7, and the liquid crystal element 6, and is reflected toward a detection optical path by the polarization beam splitter 5.

In this embodiment, a focusing error signal is generated by an astigmatism method, and a tracking error signal is generated by a differential push-pull method. Convergent light passing through a light-collecting lens 12 and a cylindrical lens 13 enters a photodetector 14 for detecting a servo error signal and a reproduction information signal, and is subjected to photoelectric conversion thereat.

Figure 5:
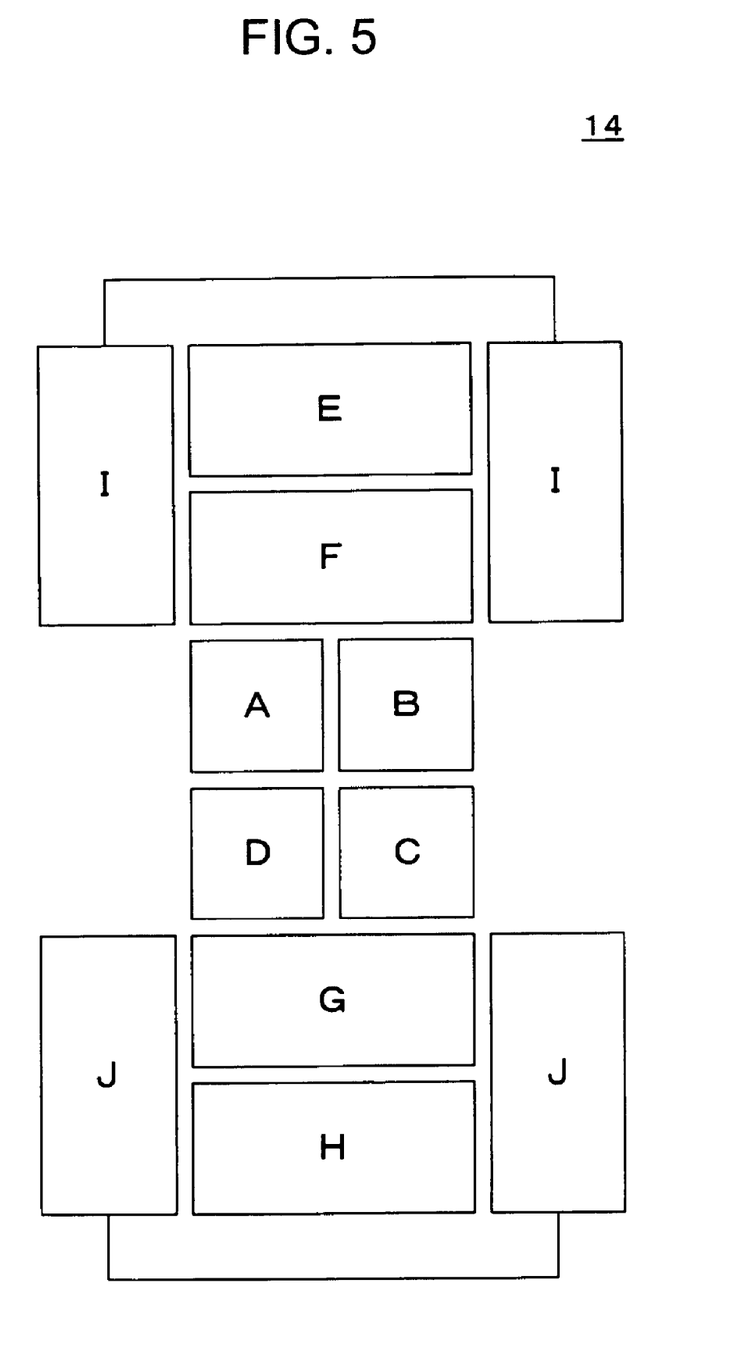
FIG. 5 is an explanatory view of a photodetector provided in the optical head.

FIG. 5 shows a photoreceptor pattern of the photodetector 14.

As shown in FIG. 5, the photodetector 14 of this embodiment includes one four-divided photosensor (A, B, C, and D) serving as the first light-receiving section, two two-divided photosensors (E and F, and G and H) serving as the second light-receiving sections, and two photosensors (I and J) disposed as the third light-receiving section near the above two-divided photosensors.

Of the three beams divided from the laser light by the diffraction grating 4, reflected light of the 0-order light is received by photoreceptors A, B, C and D, and reflected light of the +1-order light and reflected light of the −1-order light are received by photoreceptors E and F, and G and H.

A focusing error signal and a tracking error signal are respectively calculated by an astigmatism method and a differential push-pull method on the basis of the outputs from these photoreceptors.

A focusing error signal FE is generated by calculation in the astigmatism method with the following expression in the matrix circuit 54, and is supplied to the servo circuit 61:

$$FE=(A+C)-(B+D)$$

Before describing how to generate a tracking error signal by the differential push-pull method, interlayer stray light in a double-layer disc will now be described.

The intensity ratio η of interlayer stray light in a double-layer disc is generally given by the following expression when the reflectance of the recording layer L0 is equal to that of the recording layer L1:

$$\eta = S/\pi/M^2 \cdot (2d \cdot \tan \theta)^2$$

In this expression, S represents the area of the photoreceptor, M represents the magnification of the detection optical system, d represents the interlayer distance, and θ represents the angle formed between the optical axis and the outermost peripheral beam in the disc 1.

Incidentally, when the objective lens 8 has an NA of 0.85, and the optical disc 1 includes the cover layer CVL having a refractive index of 1.6, the angle θ is approximately 32°. When it is assumed that the photoreceptors of the photodetector 14 is 150 μm square, the magnification of the optical system is 20×, and the interlayer distance is 25 μm, the intensity ratio η is found 1.8%.

Therefore, although the influence of interlayer stray light between main beams is small, the influence of a main beam on side beams is multiplied by 10 when the intensity ratio of the main beam to the side beams is 10:1, and is not negligible. When signals are recorded on only one of the layers, interlayer stray light is increased. This seriously affects the calculation of a differential push-pull signal, and detracking may be caused when the objective lens 8 is radially displaced during tracing of the track.

In order to reduce the influence, in this embodiment, the photoreceptors I and J for receiving interlayer stray light are provided near the photosensors E and F, and G and H for receiving side beams only to detect a tracking error signal TE, as shown in FIG. 5. Stray light components in the side beams are removed by using signals received by the photoreceptors I and J.

Figure 6:
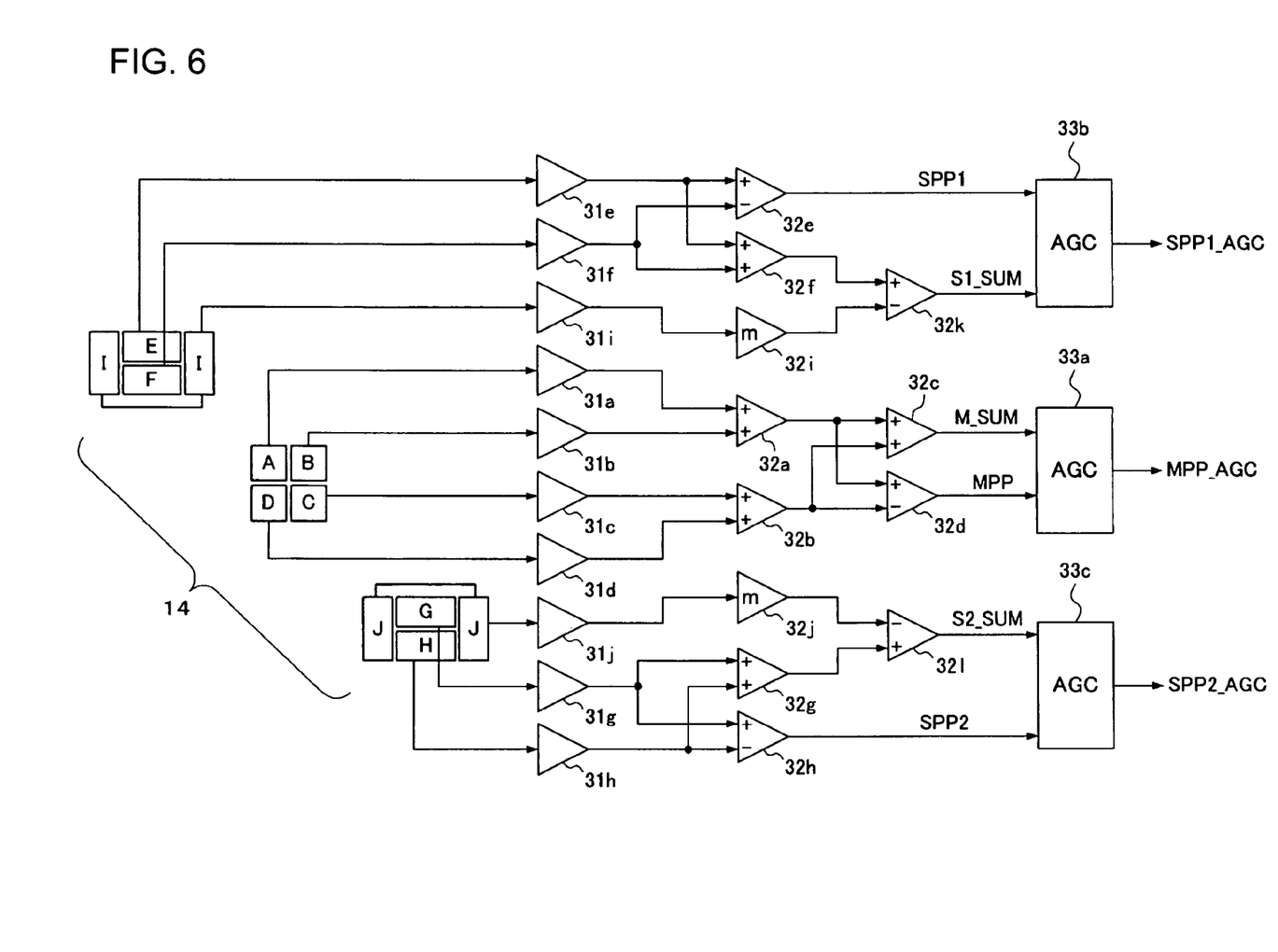
FIG. 6 is a block diagram of a push-pull-signal operating circuit in the embodiment.
Figure 7:
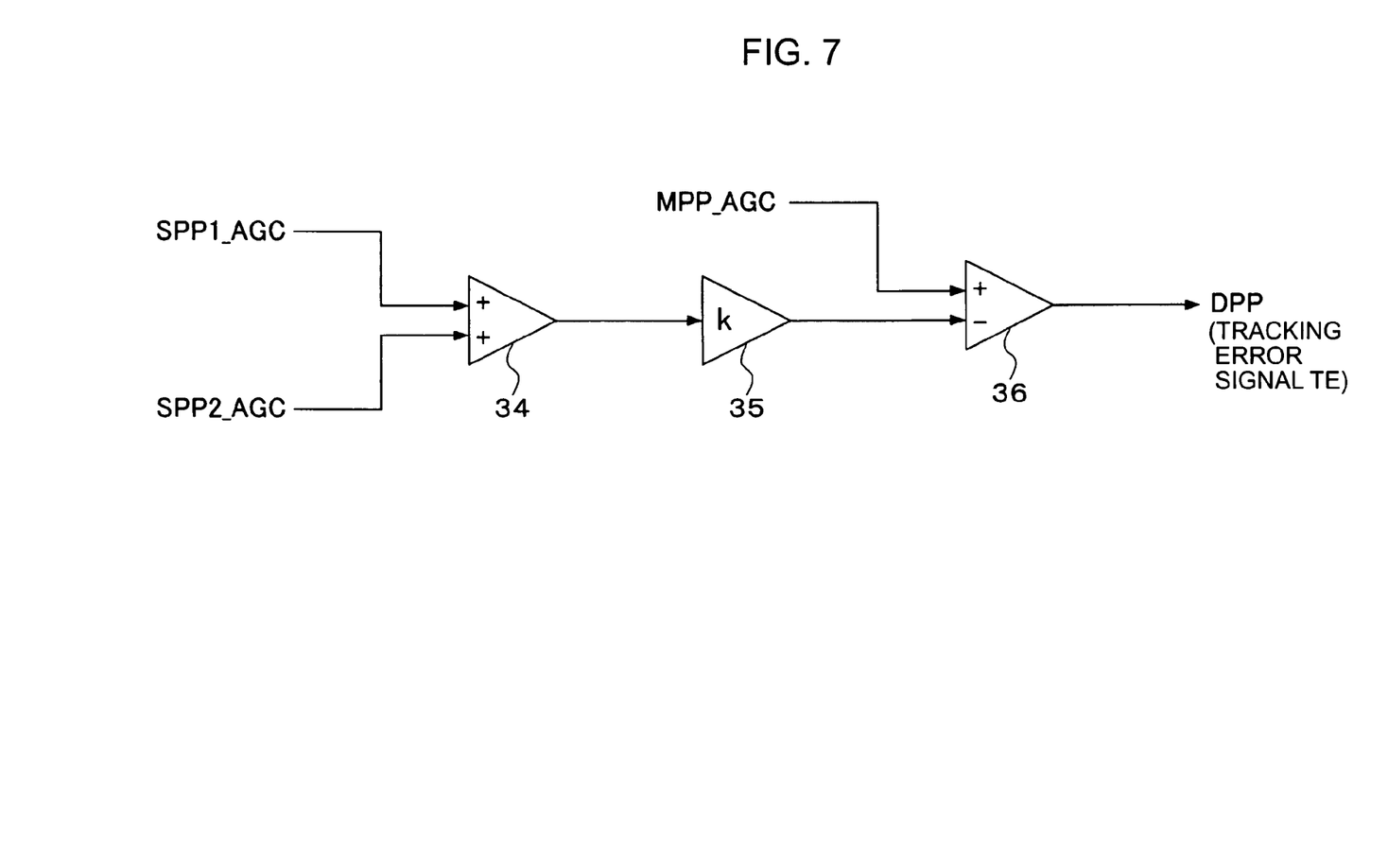
FIG. 7 is a block diagram of a tracking-error-signal generating circuit in the embodiment.

FIGS. 6 and 7 show an operating circuit system in the matrix circuit 54 that generates a tracking error signal TE in a differential push-pull method by using signals from the photodetector 14 shown in FIG. 5.

Referring to FIG. 6, head amplifiers 31a to 31j are provided correspondingly to the photoreceptors A to J in the photodetector 14. The head amplifiers 31a to 31j subject signals from the photoreceptors A to J to current-voltage conversion, and amplify the signals to a predetermined level required for later processing.

Operational amplifiers 32a to 32l are provided to operate the outputs from the head amplifiers 31a to 31j, and to thereby obtain required signals.

Hereinafter, signals output from the head amplifiers 31a to 31j in accordance with the amount of light received by the photoreceptors A to J are denoted by A to J corresponding to the photoreceptors A to J.

A main push-pull signal MPP_AGC is generated from signals A, B, C and D output from the head amplifiers 31a, 31b, 31c, and 31d corresponding to light detected by the photoreceptors A, B, C, and D as follows. The main push-pull signal MPP_AGC refers to a push-pull signal that corresponds to reflected light of 0-order diffracted light serving as the main beam and that is standardized by AGC processing.

First, the signals A and B from the head amplifiers 31a and 31b are added to generate a signal A+B by the operational amplifier 32a.

The signals C and D from the head amplifiers 31c and 31d are added to generate a signal C+D by the operational amplifier 32b.

The signal A+B from the operational amplifier 32a and the signal C+D from the operational amplifier 32b are added to obtain a sum signal M_SUM by the operational amplifier 32c, and the sum signal M_SUM is supplied to an AGC circuit 33a.

$$M\_SUM=A+B+C+D$$

The signal A+B from the operational amplifier 32a and the signal C+D from the operational amplifier 32b are also subjected to subtraction to obtain a push-pull signal MPP before standardization, and the push-pull signal MPP is supplied to the AGC circuit 33a.

$$MPP=(A+B)-(C+D)$$

In the AGC circuit 33a, the push-pull signal MPP is standardized by using the sum signal M_SUM, so that the push-pull signal for the main beam is subjected to AGC, and a standardized push-pull signal MPP_AGC is obtained.

$$MPP\_AGC=MPP/M\_SUM$$

In contrast, a side push-pull signal SPP1_AGC is generated from signals E, F, and I output from the head amplifiers 31e, 31f, and 31i corresponding to light detected by the photoreceptors E, F, and I as follows. The side push-pull signal SPP1_AGC refers to a push-pull signal that corresponds to +1-order diffracted light serving as a side beam and that is standardized by AGC processing.

The signals E and F from the head amplifiers 31e and 31f are subjected to subtraction by the operational amplifier 32e to obtain a push-pull signal SPP1 before standardization. The push-pull signal SPP1 is then supplied to an AGC circuit 33b.

$$SPP1=E-F$$

The signals E and F are also added to obtain a signal E+F by the operational amplifier 32f.

The signal I from the head amplifier 31i is multiplied by a coefficient m by the operational amplifier 32i to obtain a signal m·I.

The operational amplifier 32k subtracts the output (m·I) from the operational amplifier 32i from the output (E+F) from the operational amplifier 32f to generate a sum signal S1_SUM for standardization.

$$S1\_SUM=E+F-m\cdot I$$

In the AGC circuit 33b, the push-pull signal for the +1-order diffracted light is subjected to AGC by standardizing the push-pull signal SPP1 by using the sum signal S1_SUM. A standardized push-pull signal SPP1_AGC is thereby obtained.

$$SPP1\_AGC=SPP1/S1\_SUM$$

A side push-pull signal SPP2_AGC is generated from signals G, H, and J output from the head amplifiers 31g, 31h, and 31j corresponding to light detected by the photoreceptors G, H, and J as follows. The side push-pull signal SPP2_AGC refers to a push-pull signal that corresponds to −1-order diffracted light serving as a side beam and that is standardized by AGC processing.

The signals G and H from the head amplifiers 31g and 31h are subjected to subtraction in the operational amplifier 32h to obtain a push-pull signal SPP2 before standardization, and the push-pull signal SPP2 is supplied to an AGC circuit 33c.

$$SPP2=G-H$$

The signals G and H are also added to obtain a signal G+H by the operational amplifier 32g.

The signal J from the head amplifier 31j is multiplied by a coefficient m by the operational amplifier 32 to obtain a signal m·J.

The operational amplifier 32l subtracts the output (m·j) from the operational amplifier 32j from the output (G+H) from the operational amplifier 32g to generate a sum signal S2_SUM for standardization.

$$S2\_SUM=G+H-m\cdot J$$

In the AGC circuit 33c, the push-pull signal for the −1-order diffracted light is subjected to AGC by standardizing the push-pull signal SPP2 by using the sum signal S2_SUM. A standardized push-pull signal SPP2_AGC is thereby obtained.

$$SPP2\_AGC=SPP2/S2\_SUM$$

As described above, the standardized push-pull signals MPP_AGC, SPP1_AGC, and SPP2_AGC are generated correspondingly to 0-order diffracted light, +1-order diffracted light, and −1-order diffracted light. The signals I and J are used to generate the sum signals S1_SUM and S2_SUM for standardization of the push-pull signals SPP1 and SPP2 corresponding to +1-order diffracted light and −1-order diffracted light.

That is, the sum signal S1_SUM is obtained by subtracting the product of the stray light component I and the coefficient m from E+F, and the sum signal S2_SUM is obtained by subtracting the product of the stray light component J and the coefficient m from H+J.

By the standardization using the sum signals S1_SUM and S2_SUM in the AGC circuits 33b and 33c, AGC operation is performed while the offset due to stray light is removed. That is, the standardized push-pull signals SPP1_AGC and SPP2_AGC are adequate signals in which the stray light component is effectively reduced.

The push-pull signals MPP_AGC, SPP1_AGC, and SPP2_AGC thus obtained are processed, as shown in FIG. 7.

First, the push-pull signals SPP1_AGC and SPP2_AGC corresponding to the +1-order diffracted light are added by an operational amplifier 34 (SPP1_AGC+SPP2_AGC).

The sum of the signals is multiplied by a coefficient k by an operational amplifier 35 (k·(SPP1_AGC+SPP2_AGC)).

In an operational amplifier 36, the output of the operational amplifier 35 is subtracted from the push-pull signal MPP_AGC corresponding to 0-order diffracted light. Consequently, a tracking error signal TE is generated by the differential push-pull method.

$$TE=MPP\_AGC-k\cdot(SPP1\_AGC+SPP2\_AGC)$$

The tracking error signal TE is supplied to the servo circuit 61 to be used for tracking servo control. As described above, in the tracking error signal TE generated by the differential push-pull method, an interlayer stray light component is effectively reduced.

Therefore, it is possible to reduce errors in the operation coefficient k for the differential push-pull tracking error signal TE caused by interlayer stray light during signal recording on or reproduction from the multilayer disc. In the disc drive apparatus of this embodiment, tracking control using the differential push-pull method can be applied over various recording media including one-layer discs and multilayer discs having two or more recording layers. This achieves reliable tracking control over radial displacement of the objective lens 8.

The multiplication coefficient m used in the operational amplifiers 32i and 32j and the multiplication coefficient k used in the operational amplifier 35 may be determined arbitrarily.

A description will be given of the layout of the photoreceptors I and J for detecting interlayer stray light in the photoreceptor pattern shown in FIG. 5.

In the pattern shown in FIG. 5, the photoreceptors I and J are arranged to substantially uniformly receive stray light of 0-order diffracted light, stray light of +1-order diffracted light, and −1-order diffracted light reflected by all information recording layers which are not to be accessed (on which data is not recorded or from which data is not reproduced).

Figure 8A:
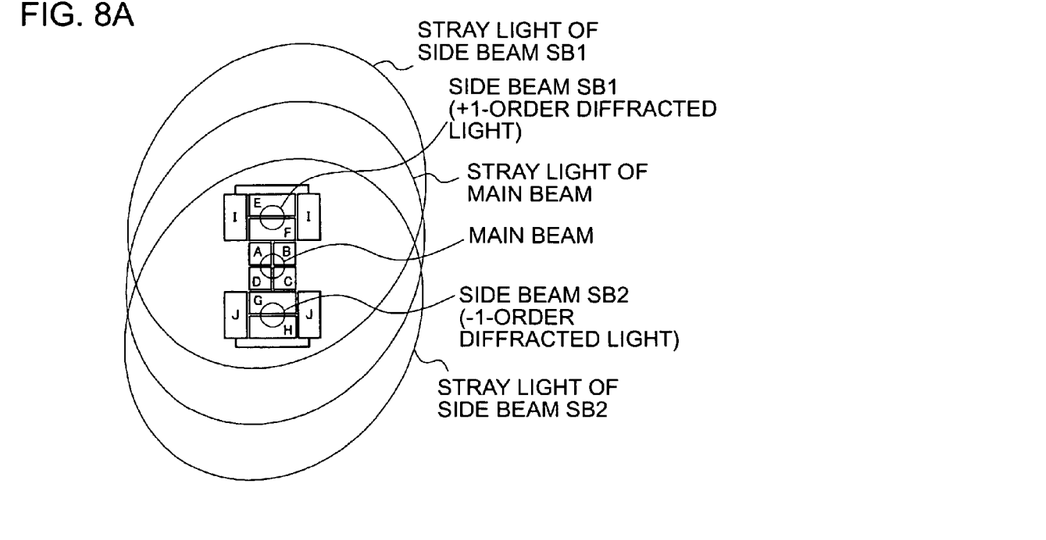
FIG. 8A is an explanatory view showing the layout of photoreceptors that can uniformly receive stray light.
Figure 8B:
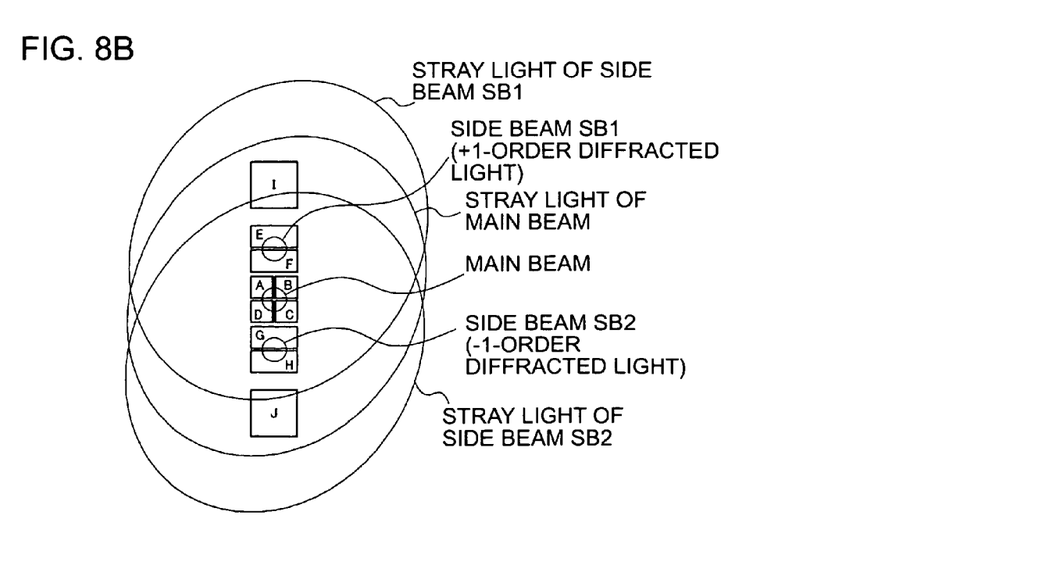
FIG. 8B is an explanatory view showing the layout of photoreceptors that cannot uniformly receive stray light.

FIGS. 8A and 8B show layout examples of the photoreceptors A to J. FIG. 8A shows the layout pattern shown in FIG. 5, and FIG. 8B shows another layout pattern. In FIGS. 8A and 8B, reflected light of a main beam (0-order diffracted light), reflected light of a side beam SB1 (+1-order diffracted light), reflected light of a side beam SB2 (−1-order diffracted light), and stray light of the main beam and the side beams SB1 and SB2 are shown by reflected light spots applied on the photoreceptors A to J.

As shown in the figures, the main beam (0-oder diffracted light) is received by the photoreceptors A, B, C, and D.

The side beam SB1 is received by the photoreceptors E and F, and the side beam SB2 is received by the photoreceptors G and H. Stray light of the main beam and the side beams SB1 and SB2 is widely applied over the photoreceptors A to J.

In the pattern shown in FIG. BB, the photoreceptors I and J are arranged so as not to uniformly receive 0-order diffracted light and +1-order diffracted light (that is, stray light) reflected by all information recording layers on or from which information is being recorded or reproduced.

In this case, the photoreceptor I does not uniformly receive stray light of the side beam SB2, and the photoreceptor J does not uniformly receive stray light of the side beam SB1. For this reason, the amount of light received by the photoreceptors I and J is different from the amount of light received by the photoreceptors E and F, and G and H for the side beams. This makes it difficult to completely remove a stray light component in the above-described method for generating a tracking error signal TE.

When the photoreceptors I and J are arranged to uniformly receive 0-order diffracted light and +1-order diffracted light (stray light) reflected by all information recording layers on or from which information is being recorded or reproduced, the amount of stray light received by the photoreceptors I and J is equivalent to the amount of stray light received by the photoreceptors E and F, and G and H. Consequently, it is possible to completely remove a stray light component from a tracking error signal TE obtained by the above-described operation.

The photoreceptor pattern shown in FIG. 8A (FIG. 5) allows the removable of the stray light component.

As FIG. BA shows, both the photoreceptors I and J can uniformly receive 0-order diffracted light and +1-order diffracted light (i.e., stray light) reflected by all information recording layers on or from which information is being recorded or reproduced. Since the photoreceptors I and J can receive stray light of the side beam SB1 and stray light of the side beam SB2, similarly to the photoreceptors E, F, G, and H for the side beams, stray light can be completely removed by the above-described operation.

That is, the photoreceptors I and J are appropriately arranged so as to substantially uniformly receive 0-order diffracted light and ±1-order diffracted light (stray light) reflected by all information recording layers on or from which information is being recorded or reproduced.

The layout pattern that allows the light to be thus uniformly received is not limited to that shown in FIG. 5.

While the embodiment of the present invention has been described above, various modifications are possible.

In the optical system of the above embodiment, the main beam (0-order diffracted light) and the side beams (±1-order diffracted light) are detected by the four-divided and two-divided photosensors (A to H), and stray light is detected by the undivided photosensors (I, J). The number of division of the photosensors is not limited to two and four.

While the area of the photoreceptors I and J for stray light is equivalent to that of the photoreceptors E, F, G, and H for the side beams, it may be arbitrarily determined.

However, the following advantage is provided by setting the area of the photoreceptors I and J to be equivalent to that of the photoreceptors E, F, G, and H:

In fact, the intensity distribution of a light spot on the photoreceptor is not always uniform, because of the influence of interference of stray light of the main beam and stray light of the side beams.

Figure 9:
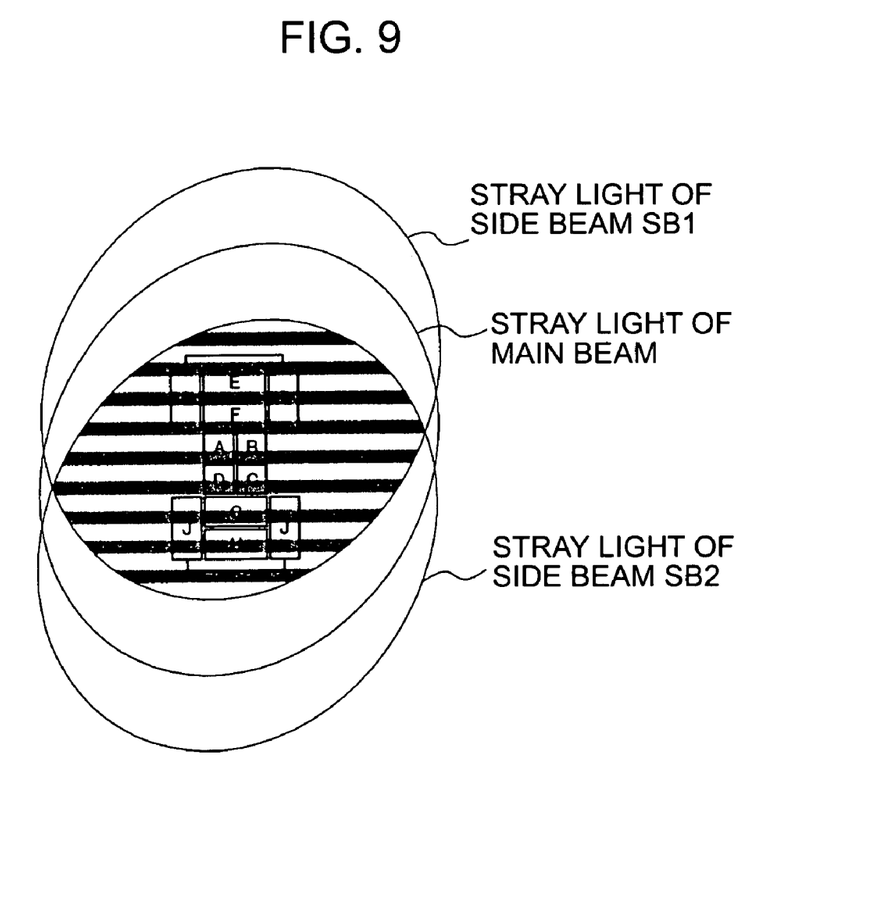
FIG. 9 is an explanatory view showing the areas of the photoreceptors.

For example, in a case in which stray light has an intensity distribution shown in FIG. 9, when the area of the photoreceptors I and J for stray light is different from the area of the photoreceptors E, F, G, and H for ±1-order diffracted light, the amount of light received by the photoreceptors I and J may be different from the amount of light received by the photoreceptors E, F, G, and H.

In contrast, when the area of the photoreceptors I and J is equivalent to that of the photoreceptors E, F, G, and H, the amount of stray light received by the photoreceptors I and J can be equal to the amount of stray light received by the photoreceptors E and F, and G and H even in the case of the intensity distribution shown in FIG. 9. This is advantageous in removing stray light by the above-described operation for generating a tracking error signal TE.

Only one of the photoreceptors I and J must be provided for stray light. For example, when only the photoreceptor I is used, the sum signals S1_SUM and S2_SUM are given by the following expressions:

$$S1\_SUM = E + F - m \cdot I$$

$$S2\_SUM = G + H - m \cdot I$$

While the disc drive apparatus is provided for Blu-ray Discs and a single lens is used as the objective lens 8 having a high NA in the above embodiment, an optical head having an equivalent NA can also be achieved with a two-unit objective lens.

While the liquid crystal element 6 is used to correct spherical aberration caused by a thickness error of the cover layer in the disc 1, other elements, such as an expander lens, may be used.

Furthermore, the present invention is also useful not only to Blu-ray Discs, but also to all multilayer optical disc recording media.

It should be understood by those skilled in the art that various modifications, combinations, sub-combinations and alterations may occur depending on design requirements and other factors insofar as they are within the scope of the appended claims or the equivalents thereof.

What is claimed is:

1. An optical drive apparatus comprising:
    an optical head that applies laser light onto a recording medium having a plurality of information recording layers for recording and/or reproduction and that detects reflected light from the recording medium;
    a signal generating circuit that generates a focusing error signal, a tracking error signal, and an information signal on the basis of the reflected light detected by the optical head;
    a reproduction circuit that obtains reproduction information by processing the information signal generated by the signal generating circuit; and
    a servo circuit that performs focusing servo operation and tracking servo operation according to the focusing error signal and the tracking error signal generated by the signal generating circuit, wherein the optical head includes a laser light source for emitting the laser light, an optical system that produces 0-order diffracted light, +1-order diffracted light, and −1-order diffracted light from the laser light emitted from the laser light source, that forms an optical path for applying the 0-order diffracted light, the +1-order diffracted light, and the −1-order diffracted light onto the recording medium, and that forms an optical path for guiding the reflected light from the recording medium, and a light-receiving device for receiving and detecting the reflected light guided by the optical system, wherein the light-receiving device includes a first light-receiving section divided at least in a tangential direction of a recording track on the recording medium to detect reflected light of the 0-order diffracted light, two second light-receiving sections divided at least in the tangential direction of the recording track on the recording medium to detect reflected light of the +1-order diffracted light and reflected light of the −1-order diffracted light, and two third light-receiving sections provided near each of the two second light-receiving sections and at positions such as not to receive reflected light of the 0-order diffracted light, reflected light of the +1-order diffracted light, and reflected light of the −1-order diffracted light from a target information recording layer of the information recording layers to be accessed, the third light-receiving sections receiving stray light reflected from one or more information recording layers other than the target information recording layer, wherein the third light-receiving sections each have an area equivalent to the area of photoreceptors of the two second light-receiving sections, and wherein the signal generating circuit generates the tracking error signal in a differential push-pull method on the basis of detection signals from the first, second, and third light-receiving sections, wherein the signal generating circuit generates a first push-pull signal for the 0-order diffracted light on the basis of the detection signal from the first light-receiving section, generates a second push-pull signal for the +1-order diffracted light and a third push-pull signal for the −1-order diffracted light on the basis of the detection signals from the second light-receiving sections, standardizes the first, second, and third push-pull signals, generates the tracking error signal by operation on the standardized first, second, and third push-pull signals, and generates, on the basis of the detection signal from the third light-receiving sections, standardization signals used to standardize the second and third push-pull signals.

2. The optical drive apparatus according to claim 1, wherein the standardization signals are generated by subtracting the product of the detection signal from the third light-receiving sections and a coefficient from the sum of the detection signals from the second light-receiving sections.

3. A tracking-error-signal generating method for an optical drive apparatus having an optical head, wherein the optical head includes a laser light source for emitting laser light, an optical system that produces 0-order diffracted light, +1-order diffracted light, and −1-order diffracted light from laser light emitted from the laser light source, that forms an optical path for applying the 0-order diffracted light, the +1-order diffracted light, and the −1-order diffracted light onto a recording medium having a plurality of information recording layers, and that forms an optical path for guiding reflected light from the recording medium, and a light-receiving device for receiving and detecting the reflected light guided by the optical system, wherein the light-receiving device includes a first light-receiving section divided at least in a tangential direction of a recording track on the recording medium to detect reflected light of the 0-order diffracted light, two second light-receiving sections divided at least in the tangential direction of the recording track on the recording medium to detect reflected light of the +1-order diffracted light and reflected light of the −1-order diffracted light, and two third light-receiving sections provided near each of the two second light-receiving sections and at positions such as not to receive reflected light of the 0-order diffracted light, reflected light of the +1-order diffracted light, and reflected light of the −1-order diffracted light from a target information recording layer of the information recording layers to be accessed, the third light-receiving sections receiving stray light reflected from one or more information recording layers other than the target information recording layer, wherein the third light-receiving sections each have an area equivalent to the area of photoreceptors of the two second light-receiving sections, and wherein the tracking-error-signal generating method comprises the steps of:

generating a first push-pull signal for the 0-order diffracted light on the basis of a detection signal from the first light-receiving section;

standardizing the first push-pull signal;

generating a second push-pull signal for the +1-order diffracted light and a third push-pull signal for the −1-order diffracted light on the basis of detection signals from the second light-receiving sections;

generating, on the basis of a detection signal from the third light-receiving sections, standardization signals used to standardize the second push-pull signal and the third push-pull signal;

standardizing the second and third push-pull signals by using the standardization signals; and generating a tracking error signal in a differential push-pull method by operating on the standardized first, second, and third push-pull signals.

4. The tracking-error-signal generating method according to claim 3, wherein the standardization signals are generated by subtracting the product of the detection signal from the third light-receiving sections and a coefficient from the sum of the detection signals from the second light-receiving sections.

* * * * *